US011286056B2

(12) United States Patent
Saez et al.

(10) Patent No.: US 11,286,056 B2
(45) Date of Patent: Mar. 29, 2022

(54) SYSTEM FOR DISPLAYING INFORMATION RELATIVE TO AN AIRCRAFT FLIGHT AND RELATED METHOD

(71) Applicant: DASSAULT AVIATION, Paris (FR)

(72) Inventors: Jean-François Saez, Louveciennes (FR); Stéphane Drinal, Paris (FR)

(73) Assignee: DASSAULT AVIATION, Paris (FR)

( * ) Notice: Subject to any disclaimer, the term of this patent is extended or adjusted under 35 U.S.C. 154(b) by 392 days.

(21) Appl. No.: 15/371,927

(22) Filed: Dec. 7, 2016

(65) Prior Publication Data

US 2017/0158345 A1    Jun. 8, 2017

(30) Foreign Application Priority Data

Dec. 8, 2015   (FR) ..................... 15 02551

(51) Int. Cl.
  *G06F 3/048*      (2013.01)
  *B64D 43/00*      (2006.01)
  *G08G 5/00*       (2006.01)
  *G01C 23/00*      (2006.01)
  *G06F 3/04817*    (2022.01)
  *G06F 3/0482*     (2013.01)
  *G06F 3/04847*    (2022.01)
  *G06F 3/04883*    (2022.01)

(52) U.S. Cl.
  CPC ............ *B64D 43/00* (2013.01); *G01C 23/00* (2013.01); *G06F 3/0482* (2013.01); *G06F 3/04817* (2013.01); *G06F 3/04847* (2013.01); *G08G 5/0021* (2013.01); *G08G 5/0052* (2013.01); *G06F 3/04883* (2013.01)

(58) Field of Classification Search
  CPC ............ H04N 7/18; G08G 5/00; G06F 3/048
  See application file for complete search history.

(56) References Cited

U.S. PATENT DOCUMENTS 8,050,860 B2 * 11/2011 Peyrucain .............. G01C 23/00
                                                      340/971
8,099,201 B1    1/2012 Barber et al.
(Continued)

FOREIGN PATENT DOCUMENTS

EP    2774850 A2    9/2014
FR    2998959       6/2014
FR    3013444       5/2015

*Primary Examiner* — Rashawn N Tillery
(74) *Attorney, Agent, or Firm* — Davidson, Davidson & Kappel, LLC

(57) ABSTRACT

A system for displaying information relative to an aircraft flight and related method are provided. This system comprises a display device, and a module for managing the display on the display device, the management module being configured for controlling the display, on a window of the display device, of a timescale representative of a time period of the flight, and for controlling the display, facing the timescale, of pieces of information relative to a series of events intended to occur in a time window comprised in the time period. The module for managing the display is configured for determining a position in time of the time window comprised in the time period and a duration of the time window, and for controlling the display, along the timescale, of a marker representative of the position in time and of the duration of the time window.

22 Claims, 6 Drawing Sheets

(56) References Cited

U.S. PATENT DOCUMENTS

| | | | |
|---|---|---|---|
| 8,665,121 B2* | 3/2014 | Shavit | G08G 5/0043 340/945 |
| 8,806,543 B1* | 8/2014 | Curtis | B64D 11/00151 244/118.6 |
| 9,126,695 B2* | 9/2015 | Latorre-Costa | B64D 43/00 |
| 9,153,137 B2* | 10/2015 | Hankers | G01W 1/00 |
| 9,299,116 B2* | 3/2016 | Williams | H04N 21/25841 |
| 9,349,296 B2* | 5/2016 | Wiesemann | G01C 23/00 |
| 2007/0150178 A1* | 6/2007 | Fortier | G08G 5/0034 701/467 |
| 2010/0049380 A1* | 2/2010 | Hiale-Guilhamou | G08G 5/0013 701/3 |
| 2011/0102192 A1* | 5/2011 | Batsakes | G08G 5/0021 340/905 |
| 2013/0046422 A1* | 2/2013 | Cabos | G08G 5/0034 701/3 |
| 2013/0268878 A1* | 10/2013 | Le Roux | G09B 9/08 715/772 |
| 2014/0005861 A1* | 1/2014 | Mere | G08G 5/0039 701/3 |
| 2014/0019863 A1* | 1/2014 | Callanan | G06F 3/0484 715/720 |
| 2014/0156114 A1* | 6/2014 | Aymeric | G01C 23/00 701/3 |
| 2014/0156115 A1* | 6/2014 | Aymeric | G06F 3/0488 701/3 |
| 2015/0066285 A1* | 3/2015 | Albouy | G07C 5/006 701/29.3 |
| 2015/0142224 A1 | 5/2015 | Latorre-Costa et al. | |
| 2016/0047674 A1* | 2/2016 | Ramaiah | G08G 5/0052 340/995.27 |
| 2016/0225263 A1* | 8/2016 | Salentiny | G08G 5/003 |
| 2018/0188051 A1* | 7/2018 | Gaspard-Boulinc | G01C 21/3469 |

\* cited by examiner

SYSTEM FOR DISPLAYING INFORMATION RELATIVE TO AN AIRCRAFT FLIGHT AND RELATED METHOD

This claims the benefit of French Patent Application FR 15 02551, filed Dec. 8, 2015 and hereby incorporated by reference herein.

The present invention relates to a system for displaying information relative to at least one flight of an aircraft, the displaying system comprising:
  a display device,
  a module for handling the display on the display device of pieces of information relative to the flight of the aircraft, the module for managing the display being configured for controlling the display, on a window of the display device, with a timescale representative of a time period of the flight, and for controlling the display, facing the time scale, of pieces of information relative to a series of events intended to occur in a time window comprised in the time period.

BACKGROUND

In particular it applies to the display, in an aircraft cockpit, during a flight of the aircraft, of pieces of information relative to this flight, in particular to events or tasks provided during this flight, such as the passages of the aircraft in determined passage points, hazards encountered during the flight, the application of procedures or radio communications, each event being intended to be achieved in a pre-defined achieving instant.

In order to inform the crew of the aircraft on the sequence of events which will be encountered during the flight, illustrating on a screen positioned in the cockpit of the aircraft of a graphic window has been proposed, including a graduated time scale representative of the time of flight or of a given time interval during this time of flight, as well as events intended to occur during this flight, each event being displayed facing the instant of occurrence of this event on the time scale.

Such an illustration does not give entire satisfaction, since it does not give the possibility to the crew of rapidly evaluating the work burden implied by the different events or tasks over the duration of the flight.

SUMMARY OF THE INVENTION

An object of the invention is therefore to provide a system and a suitable display method for displaying to the crew an illustration of the events or tasks which will occur during a flight or a mission, by allowing the crew to locate these events in the timeline of the flight, and of appreciating the required work load during different phases of the flight.

For this purpose, a system of the aforementioned type is provided, characterized in that the module for managing the display is configured for determining a time position of the time window in the time period and a duration of the time window, and for controlling the display, along the time scale of a marker representative of the time position and of the duration of the time window.

The system according to the invention may comprise one or several of the following features, taken individually or according to any technically possible combination:
  the series of events is intended to occur between an initial instant of occurrence of a first event of the series of events, and a final instant of occurrence of a last event of the series of events, and in that the time window is defined between the initial instant and the final instant;
  the module for managing the display is configured for determining the initial instant and the final instant, the marker being indicative of the initial instant and of the final instant;
  the marker extends along the timescale between a first end positioned facing a first position on the timescale corresponding to the initial instant and a second end positioned facing a second position on the timescale corresponding to the final instant;
  the module for managing the display is configured for controlling the display, for each of a plurality of events intended to occur in the time period, of a marker positioned along the timescale in a representative position of the instant at which the event is intended to occur;
  the system comprises a man-machine interface, and the module for managing the display is configured for detecting an action for modifying the series of events, applied by an operator via the man-machine interface, in order to determine a modified series of events to be displayed in response to the modification action, and for controlling the display, facing the timescale, of the modified series of events;
  the module for managing the display is configured for determining a modified time window in which the modified series of events is intended to occur, and for controlling the display, along the time scale, of a modified marker representative of the time position of the modified time window in the time period and the duration of the modified time window;
  the action for modifying the series of events comprises a modification of the number of events comprised in the series of events;
  the action for modifying the series of events comprises a modification of the time position of the series of events in the time period;
  at least one portion of the events of the series of events is selected from the group consisting in overlying a passage point by the aircraft, the establishment of a radio communication, the initiation of a procedure and a weather event.

A method for displaying pieces of information relative to at least one flight of an aircraft is also provided, comprising:
  a display, on a display device, of a timescale forming a time scale representative of a time period of the flight,
  a display, facing the time scale, of pieces of information relative to a series of events intended to occur in a time window comprised in the time period,
  the display method being characterized in that it further comprises:
    a determination of a time position of the time window in the time period and of a duration of the time window, and
    a display, along the time scale, of a marker representative of the time position and of the duration of the time window.

The method according to the invention may comprise one or several of the following features, taken individually or according to any technically possible combination:
  the display method comprises:
    detection of an action for modifying the series of events, applied by an operator via a man-machine interface,
    determination of a modified series of events to be displayed in response to the modification action, and a display, facing the time scale, of the modified series of events.

the method comprises a determination of a modified time window in which the modified series of events is intended to occur, and a display, along the time scale, of a modified marker representative of the time position of the modified time window in the time period and of the duration of the modified time window;

the action for modifying the series of events comprises a modification of the number of events comprised in the series of events;

the action for modifying the series of events comprises a modification of the time position of the series of events in the time period.

BRIEF SUMMARY OF THE DRAWINGS

The invention will be better understood upon reading the description which follows, exclusively given as an example, and made with reference to the appended drawings, wherein.

DETAILED DESCRIPTION

Figure 1:
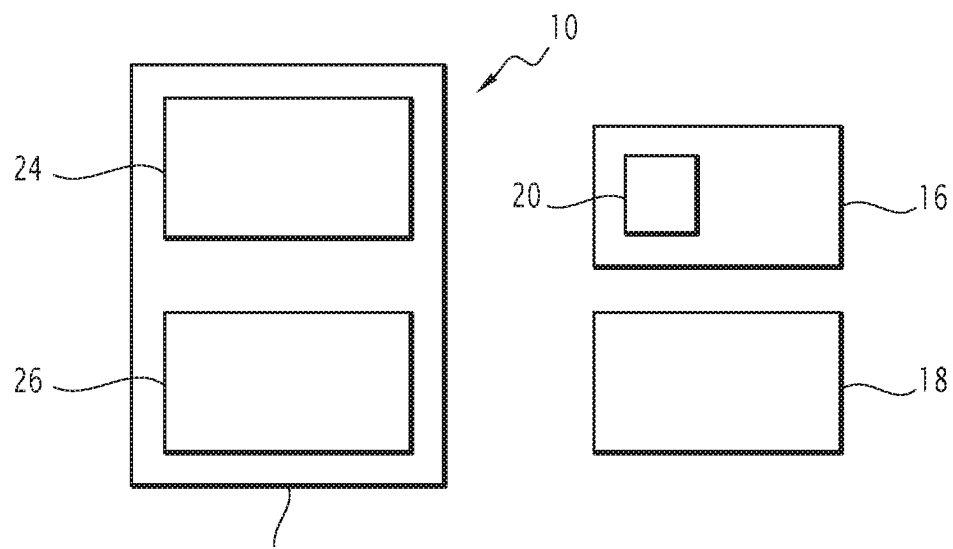
FIG. 1 is a schematic view of a displaying system according to an embodiment of the invention.

A displaying system 10 according to an embodiment of the invention is illustrated in FIG. 1. This system 10 is intended to be at least partly placed in the cockpit of an aircraft, in order to give the possibility to the crew of the aircraft of viewing the different events intended to occur during a flight of the aircraft, by providing the crew with an overall view of the ordering of these events and of the work load implied by these events during the flight of the aircraft.

The system 10 includes a central processing unit 14, a display device 16 and a man-machine interface 18 giving the possibility to the crew of interacting with the central processing unit 14 and/or with the display device 16.

The display device 16 is preferably placed in the cockpit of the aircraft.

The display device 16 comprises a screen 20 and graphical information processing means, for example a graphic processor and an associated graphic memory.

The graphic processor is suitable for processing graphic information stored in the graphic memory and for producing the display on the screen 20 of this piece of information or of a representation of the latter.

The man-machine interface 18 is notably intended to allow parameterization by an operator, notably a member of the crew, of the pieces of information displayed by the display device 16, as described hereafter.

The man-machine interface 18 for example comprises a tactile control device, configured for detecting the position of one or several members, called subsequently control members, on a surface of the tactile control device.

In a known way, these control members may be a stylus or the fingers of an operator.

In the subsequent description, an embodiment will be considered in which the tactile control device and the screen 20 have a common shape, as a touch screen.

Thus, the man-machine interface 18 is configured for detecting the position of one or several control members, on the surface of the screen 20.

The central processing unit 14 is adapted for executing applications required for the operation of the display system 10.

For this purpose, the central processing unit 14 comprises one processor 24 and at least one memory 26.

The processor 24 is adapted for executing applications contained in the memory 26, notably an operating system allowing standard operation of a computer system.

The memory 26 comprises different memory areas notably containing pieces of information relative to at least one mission of the aircraft, and applications intended to be executed by the processor 24.

The pieces of information relative to the mission of the aircraft notably comprise for each flight of the mission, a sequence of events intended to occur during the flight.

These events may be classified in several types, notably:
overflight by the aircraft of predefined passage points, according to the flight plan,
radio communications provided between the crew and a control authority,
the initiation of procedures, for example procedures for changing flight level or for changing a flight phase,
the occurrence of hazards, notably weather hazards, for example crossing areas with a strong wind,
specific actions intended to be performed by the crew, for example voice announcements intended for the passengers; these actions are intended to be performed at set instants during the flight or during the overflying by the aircraft of set passage points, and may comprise tasks intended to be carried out by a member of the crew personally.

With each of the events are associated in the memory 26, pieces of information relative to this event. These pieces of information are of several distinct natures.

In particular, these pieces of information comprise an instant for the set or provided occurrence of this event. Notably, with each event intended to be achieved during the overlying of the aircraft of a given point during the flight is associated a provided instant for overflight of this point by the aircraft. This provided instant is initially determined, i.e. before the flight, according to the flight plan of the aircraft, and may be updated at each instant during the flight of the aircraft depending on the position of the aircraft at this instant, on the capabilities of the aircraft and on weather conditions.

These pieces of information moreover comprise, for each event, a descriptor of this event, intended to be displayed for the crew.

These pieces of information also comprise, for each overflight of a passage point, an identifier of this passage point, the longitude and latitude coordinates of the passage point, navigation data provided in this passage point, as well as weather data in this passage point and the fuel reserve of the aircraft.

The navigation data notably comprise the altitude, the speed and the course provided at the passage point. The weather data for example comprise the temperature, the pressure, the speed and the direction of the wind provided at the passage point at the provided instant when the aircraft flies over this point.

The memory 26 comprises a displayer manager or an application 30 for handling the display on the display device 16, subsequently called the module 30 for handling the display.

The module 30 is configured for controlling the display, on a window of the display device 16, in the example described on a window of the screen 20, of a summarized illustration of a series of events intended to occur during at least one flight of a mission of the aircraft, in order to provide the crew with an overall view of the time ordering of these events and of the work load induced by these events.

In particular, the module 30 is configured for controlling the display on a dedicated window of the screen 20 of a timescale representative of a given time period during the mission of the aircraft. The timescale thus symbolizes the time course of at least one portion of the mission. This time period may for example correspond to the whole of the mission, to the whole of a flight of the mission, or to a portion of a flight. The timescale preferably comprises a vertical axis, which may be graduated.

The module 30 is moreover configured for controlling the display, facing the time scale, of pieces of information relative to a series of events, comprising a predetermined number of events intended to occur in a time window comprised in the time period illustrated by the timescale.

The time window is defined between an initial instant, corresponds to an initial instant of occurrence of the first event of the series of events, and a final instant corresponding to an instant of occurrence of the last event of the series of events. The time window for example corresponds to the whole of the time period of the flight or of the mission illustrated by the time scale, or to a fraction of this time period.

The instant of the beginning and the length of the time interval may be parameterized by an operator via the man-machine interface 18, as described hereafter.

Moreover, the series of events for example includes the whole of the events intended to occur in this time window or a sub-set of the events intended to occur in this time window. Notably, such a sub-set may exclusively include events of one or several given types, for example events of the type of the overflight of the aircraft of the passage points.

For each of the events of the series of events a set of information relative to this even is displayed facing the timescale, issued by the memory 26. This set of pieces of information comprises all or part of the pieces of information on this event stored in the memory 26. The nature of the pieces of information displayed facing the timescale may be parameterized by an operator, via the man-machine interface 18, for each event or for each type of event.

The module 30 is further configured for controlling the display, along the timescale, of a marker intended to report the time position of the time window in the time period illustrated by the timescale, and the duration of this time window. This marker gives the possibility to the crew of viewing on which time interval the series of events is intended to occur, therefore of locating these events in the timeline of the flight or of the mission, and of evaluating the density of the work load which will be required by these events in this time interval.

Figure 2:
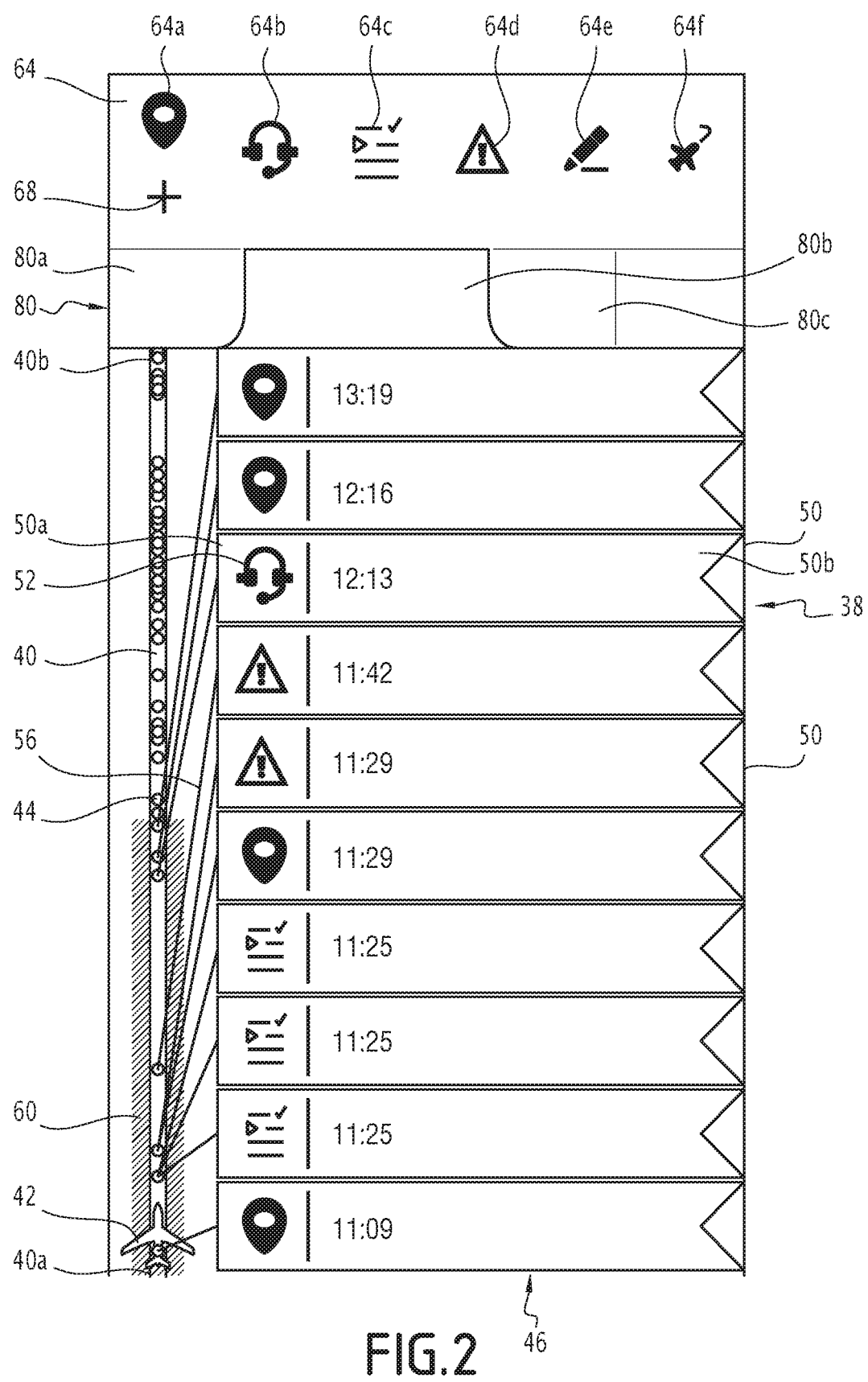
FIG. 2 illustrates a display window which may be displayed by the display system of FIG. 1, according to a first embodiment.
Figure 3:
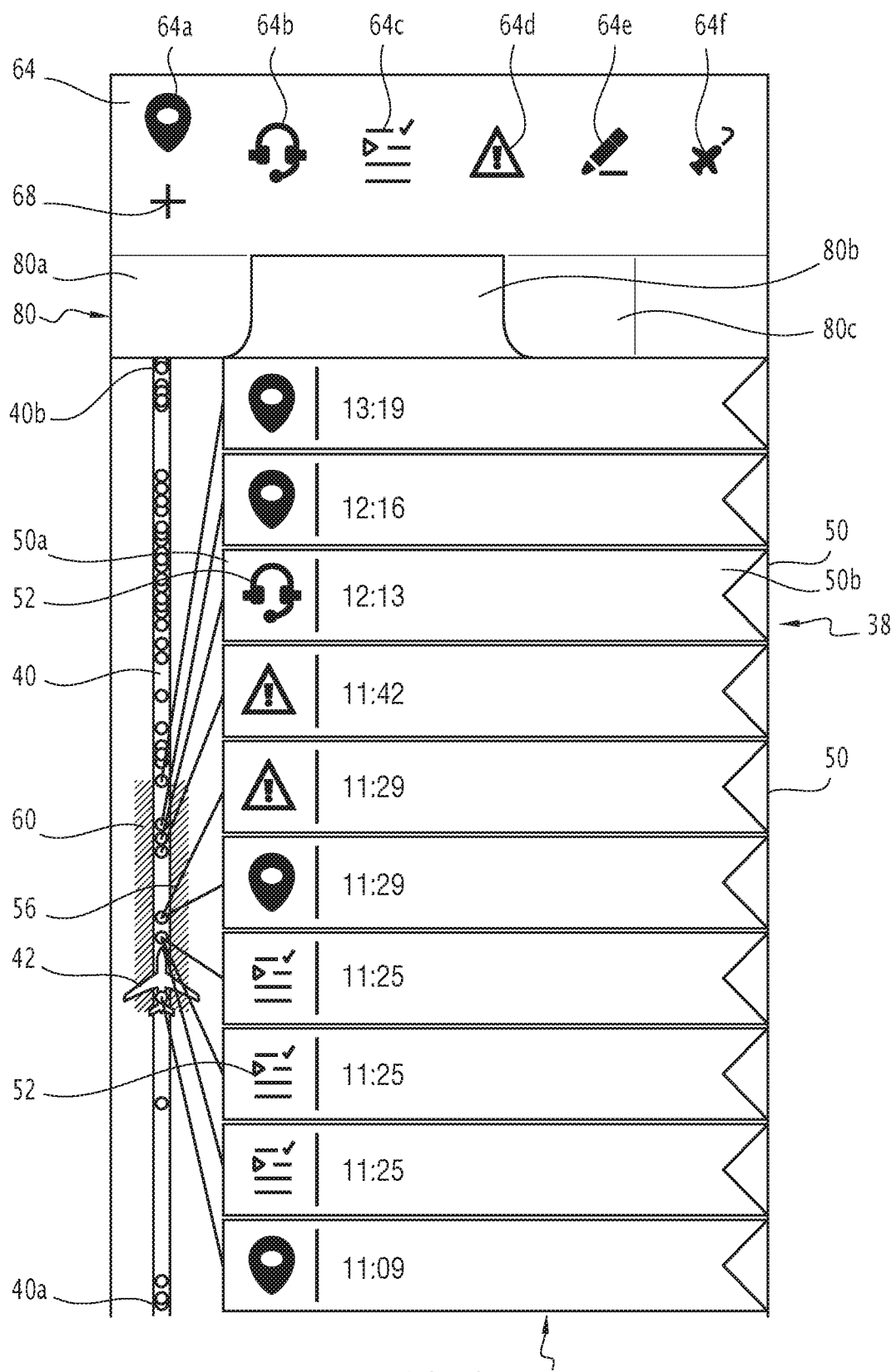
FIG. 3 illustrates display window which may be displayed by the display system of FIG. 1, according to a second embodiment.

Thus, two examples of synthetic representation which may be displayed on a window 38 of the screen 20 have been illustrated in FIGS. 2 and 3.

These representations comprise a time scale 40 forming a time scale representative of a time period T of a flight of the aircraft. The timescale 40 extends vertically from bottom to top between a low end 40*a* and an upper end 40*b*.

In a first representative embodiment illustrated in FIG. 2, the time period T is defined between the current instant and the end of the flight. The timescale 40 therefore represents the portion of the flight which remains to be carried out. In this example, the lower end 40*a* corresponds to the current instant courant and the upper end 40*b* corresponds to the end of the flight.

In a second representative embodiment illustrated in FIG. 3, the time period T is defined between the beginning of the flight and the end of the flight. The time scale 40 therefore represents the whole of the relevant flight. In this example, the lower end 40*a* corresponds to the beginning of the flight and the upper end 40*b* corresponds to the end of the flight.

Preferably, a selection of the first or second representative embodiment may be performed by an operator by means of the man-machine interface 18.

The time scale moreover comprises a symbol 42 in the form of an airplane model, representative of the current instant.

In the example illustrated in FIG. 2, the symbol 42 is therefore positioned at the lower end 40*a* of the time scale 40. In the example illustrated in FIG. 3, the symbol 42 is positioned between the lower end 40*a* and the upper end 40*b*, in a position corresponding to the current instant on the time scale 40.

On the time scale 40, is moreover positioned a plurality of markers 44, each representative of an event intended to occur in the time period T. Each marker 44 is positioned along the time scale 40 in a position representative of the instant at which the event is intended to occur. Preferably, each marker 44 is displayed according to a specific representation, for example a color and/or a specific size, representative of the duration of achievement of the associated event and/or of the work load induced by this event.

Moreover, pieces of information relative to a series of events intended to occur in a given time window FT, comprised in the time interval T illustrated by the time scale 40, are displayed on the window 38, in a display frame 46 positioned facing the timescale.

The pieces of information relative to each event of the series of events are displayed in a dedicated display area 50. The different display areas 50 are spatially ordered on the window 38 according to the time ordering of the associated events. Notably, the different display areas 50 are ordered vertically from bottom to top depending on the provided instant for occurrence of the associated events.

In the examples illustrated in FIGS. 2 and 3, each display area 50 comprises a first quadrant 50*a* in which an icon 52 representative of the type of associated event is displayed. Notably, the icon 52 is different according to whether the event is an overflight of a passage point, a radio communication, the initiation of a procedure, the occurrence of a hazard, or a specific action intended to be carried out by the crew.

The display of such an icon 52 allows the crew to very rapidly view the type of event, therefore the work load which will be induced by this event.

Each display area 50 moreover comprises a second quadrant 50b displaying the provided instant of occurrence of the event, a descriptor of this event, and optionally other pieces of information relatives to this event. Notably, if the event is an overflight of a passage point, an identifier of this passage point, the longitude and latitude coordinates of the passage point, navigation data provided in this passage point may be displayed in the quadrant 50b, as well as weather data in this passage point and data relative to the fuel reserve of the aircraft.

The nature of the pieces of information displayed in the quadrant 50b may be parameterized by an operator, as described hereafter.

Preferably, as illustrated in FIGS. 2 and 3, each display area 50 is connected through a link 56 to the marker 44 of the time scale 40 which is associated with the event. The link 56 gives the possibility of matching each of the events described in a display area 50 with the instant of occurrence of this event on the time scale 40.

The links 56 give the possibility to the crew of viewing the time distribution of the series of events, in particular to become aware of the distance in time between two events displayed in two adjacent display areas 50.

Preferably, the module 30 is configured for displaying on the window 38 a predetermined number of display areas 50. This predetermined number of display areas 50 may be parameterized by an operator, as described hereafter. The height of each display area 50 depends on the number of displayed display areas 50. In particular, the height of each display area 50 is for example equal to the ratio between the total height of the frame 46 and of the number of display areas 50.

The series of events displayed facing the timescale 40 is intended to occur between an initial instant, corresponding to an initial instant of occurrence of the first event of the series of events, and a final instant, corresponding to an instant of occurrence of the last event of the series of events. The time window FT is therefore defined between this initial instant and this final instant.

A marker 60 representative of the time position of this time window FT in the time period T, and the duration of this time window, is positioned along the timescale 40.

In the illustrated examples, the marker 60 is superposed to the timescale 40 and extends along this time scale between a first end positioned facing a position on the time scale 40 corresponding to the initial instant of occurrence of the first event of the series of events, and a second end positioned facing a position on the time scale 40 corresponding to the final instant of occurrence of the last event of the series of events. For example, the marker 60 is a colored area superposed to the time scale 40.

The series of events displayed facing the time scale 40 may be modified by an operator. The module 30 is configured for detecting an action for modifying this series of events, applied by an operator via the man-machine interface 18 and for accordingly modifying the display areas 50. Moreover, the module 30 is configured for determining, subsequently an action for modifying the displayed series of events, a modified time window FT' comprising these events, and for accordingly modifying the position and/or the length of the marker 60 along the time scale 40.

The modification of the series of events is for example a modification of the number of displayed events in the display areas 50, and/or a modification of the time position of the series of events associated with these display areas 50, i.e. of the time position of the time window FT.

These parameters may be set by an operator, by means of parameterization actions carried out via the man-machine interface 18.

The module 30 is configured for detecting such parameterization actions, and for modifying the display areas 50, as well as the marker 60, accordingly.

In particular, the module 30 is configured for detecting a modification of the number of events in the series of displayed events in the display frame 46 facing the time scale 40. Such a modification corresponds to a modification of the number of display areas 50 and of the duration of the time window FT.

An action for modifying the number of events is carried out by a user via the man-machine interface 18.

For example, such a modification action comprises a displacement of two control members on the touch screen 20, facing the display frame 46, in two substantially opposite directions. Notably, bringing closer both control members relatively to each other is associated with an increase in the number of events in the series of events, while moving away both control members relatively to each other is associated with a reduction in the number of events.

Figure 4:
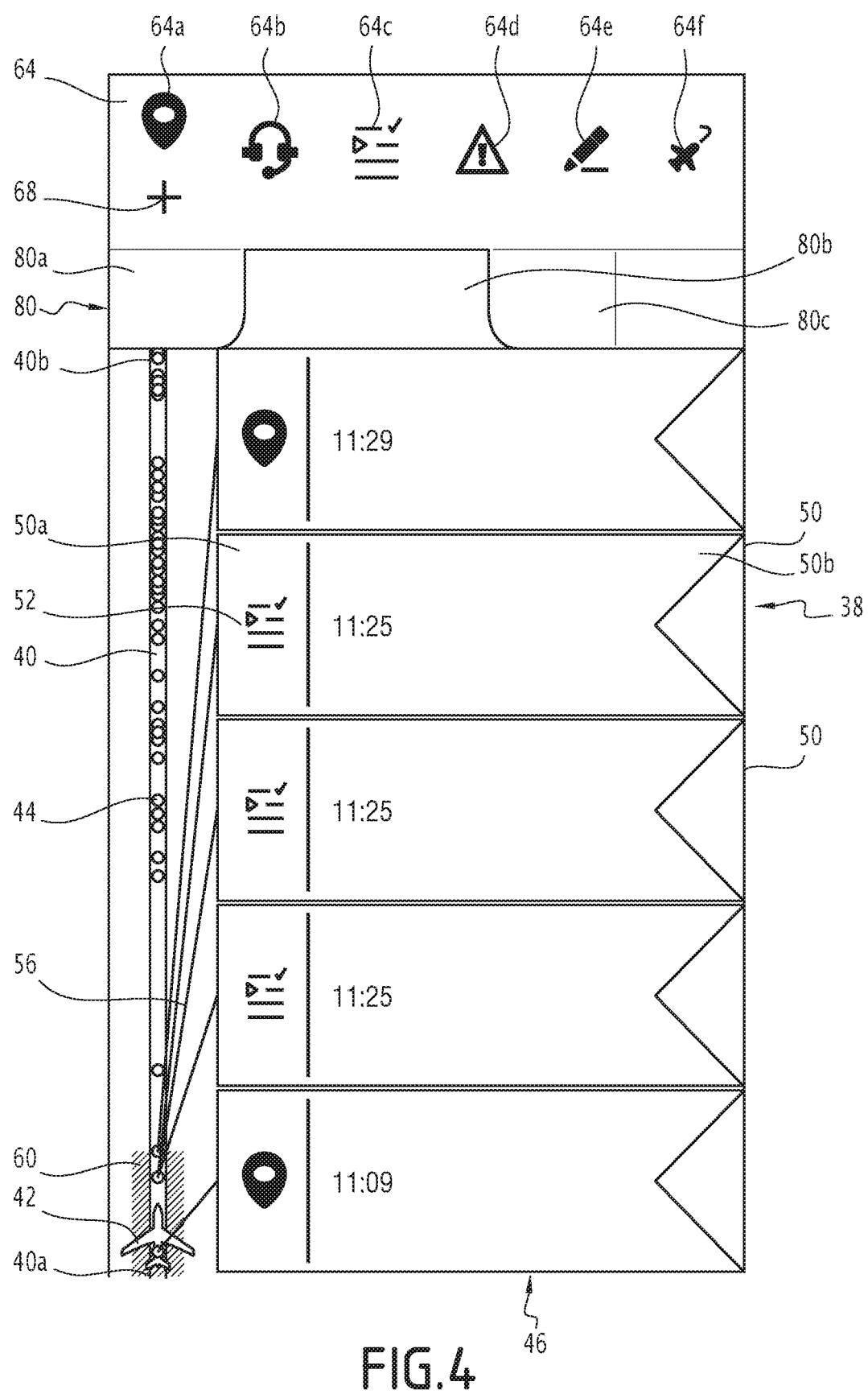
FIG. 4 illustrates a display window which may be displayed by the display system of FIG. 1, after modification of the number of displayed events relatively to the window illustrated in FIG. 2.

When such a modification action is detected, the module 30 is able to accordingly modify the number of events, therefore the number of displayed display areas 50 facing the time scale 40. FIG. 4 thus illustrates a window 38 displayed on the screen 20 after reduction of the number of displayed events, in response to a modification action carried out by an operator on the window illustrated in FIG. 2.

The module 30 is also configured for detecting an action for modifying the time position of the time window FT.

An action for modifying the time position of the time window FT is carried out by a user via the man-machine interface 18.

An action for modifying the time position of the time window FT may be of several types.

A first type of action for modifying the time position of the time window FT comprises a displacement of a member by an operator on the touch screen 20 in a direction substantially parallel to the time scale, facing the area of the screen displaying the areas 50.

A second type of action for modifying the time position of the time window FT comprises a displacement of a member by an operator on the screen tactile 20 in a direction substantially parallel to the time scale, facing the area of the screen displaying the marker 60.

For example, a displacement of a member from bottom to top facing the area of the screen displaying the areas 50 corresponds to a displacement in time of the time window 40 towards earlier instants, while a displacement of a member from top to bottom corresponds to a displacement in time of the time window 40 towards posterior instants.

Conversely, a displacement of a member from bottom to top facing the area of the screen displaying the marker 60 corresponds to a displacement in time of the time window 40 towards posterior instants, while a displacement from top to bottom corresponds to a displacement in time of the time window 40 towards earlier instants.

When such a modification action is detected, the module 30 is configured for accordingly modifying the displayed events in the display frame 46. Preferably, during the gradual displacement of the member by the operator, the display areas 50 are displaced in the display frame 46, in the displacement direction of the member, until these display areas 50 attain an upper or lower edge of the display frame 46 and are no longer visible. These display areas are replaced with new display areas 50 which appear gradually during the displacement of the member by the operator from the edge opposite to the display frame 46.

Thus, the series of events displayed in the display frame 46 is displaced in time upstream or downstream of the flight or of the mission.

When such a modification of the series of displayed events is achieved, the module 30 is able to determine a position in time and a modified duration of the time window FT, and to update accordingly the marker 60 along the time scale 40. In particular, the module 30 is able to determine the initial instant of occurrence of the first event displayed in a first display area 50, the instant of occurrence of the last event displayed in a last display area 50, and of positioning the marker 60 between this initial instant and this final instant, as illustrated in FIG. 4.

Thus, when an operator modifies the number or the time position of the events displayed in the frame 46, the modification accordingly of the marker 60 gives the possibility of viewing at any moment on which time window these events are provided, and consequently of evaluating the work load density induced by these events as well as the period during the flight during which these events will occur.

The types of events displayed in the display frame 46, the nature of the pieces of information displayed for each event or each type of event, as well as the time window illustrated by the time scale 40 are also parameters which may be modified. These parameters may be set by an operator, by means of parameterization actions carried out via the man-machine interface 18.

The module 30 is configured for detecting such parameterization actions, and for modifying the data displayed in the window 38 accordingly.

In order to facilitate the achievement of certain of these actions by an operator, the module 30 is configured for displaying on the window 38 several icons which may be actuated by an operator via the man-machine interface 18, and intended to allow parameterization of the displayed pieces of information.

In particular, the module 30 is configured for displaying on the window 38, in the example illustrated at the top of the window 38, a first series of icons 64 intended to allow selection by an operator of the type or of the types of events to be displayed in the display frame 46. Notably, this first series of icons comprises an icon 64*a* associated with the events of the passage point overflight type, an icon 64*b* associated with the events of the radio communication type, an icon 64*c* associated with the events of the procedure initiation type, an icon 64*d* associated with events of the alert or hazard type, an icon 46*e* associated with the events of the specific action type intended to be carried out by the crew, and an icon 64*f* associated with the other possible types of events.

Preferably, the graphism of at least certain of the icons 64 is similar to the graphism of the associated icons 52 illustrated in the first quadrant 50*a* for the display areas 50.

Each icon 64 forms an area actuatable by an operator. Each icon 64 may be actuated between a deactivated position, in which the events of the type associated with the icon 64 are not displayed in the display frame 46, and an activated position. In the activated position, at least certain of the events of the type associated with the icon 64 and comprised in the time window FT are displayed in the display frame 46. Preferably, the display mode of the icons 64 varies according to whether the associated type of event is either selected or not. For example, when an icon 64 is activated, it is illustrated with a given color, for example green color, while when this icon 64 is not activated, it is illustrated with another color, for example a grayish color.

This actuation is performed by means of the man-machine interface 18, for example by positioning a control member on the area of the touch screen 20 displaying the icon 64.

The icons 64 may be actuated independently of each other.

The module 30 is configured for detecting an action of parameterization of the types of events displayed in the display area, in particular the addition or the suppression of the type of events to be displayed, and for accordingly modifying the display of the pieces of information in the display frame 46. In particular, the module 30 is configured for displaying in the display frame 46 pieces of information relative to events of the selected type(s), excluding the other events.

The module 30 is moreover configured for displaying on the window 38 at least one icon 68 forming an actuatable area, intended to allow parameterization by an operator of the nature of the pieces of information displayed in the display area 50 for at least certain types of events.

For example, each icon 68 is dedicated to the parameterization of the pieces of information displayed in the display area 50 for a given type of events.

Each icon 68 is for example displayed below the icon 64 associated with the same type of events. In the example illustrated in FIG. 2, a single icon 68, intended for parameterization of the pieces of information displayed in the display area 50 for the events of the passage point overflight type, is displayed below the icon 64*a* associated with this type of events.

Each icon 68 forms an actuatable area by an operator. Each icon 68 may be actuated between an active position, allowing parameterization by an operator of the nature of the displayed pieces of information, and an inactive position.

The module 30 is configured for detecting an action for parameterization of the nature of the pieces of information to be displayed in the display areas 50.

Such a parameterization action may be of several types.

A first type comprises actuation of an icon 68 by an operator via the man-machine interface 18, followed by an action for activating or deactivating one or several boxes each associated with a nature of a piece of information, with view to selecting the pieces of information to be displayed.

For example, the module 30 is configured for detecting actuation of an icon 68 and for controlling the display, on the screen 20, of a parameterization window 70 for the nature of the pieces of information to be displayed in the display area 50 of each event of the associated type. The parameterization window 70 is for example superposed to the window 38.

The module 30 is moreover configured for detecting an inactivation action on an icon 68 and for suppressing the display of the parameterization window 70 in response to this inactivation action.

Figure 5:
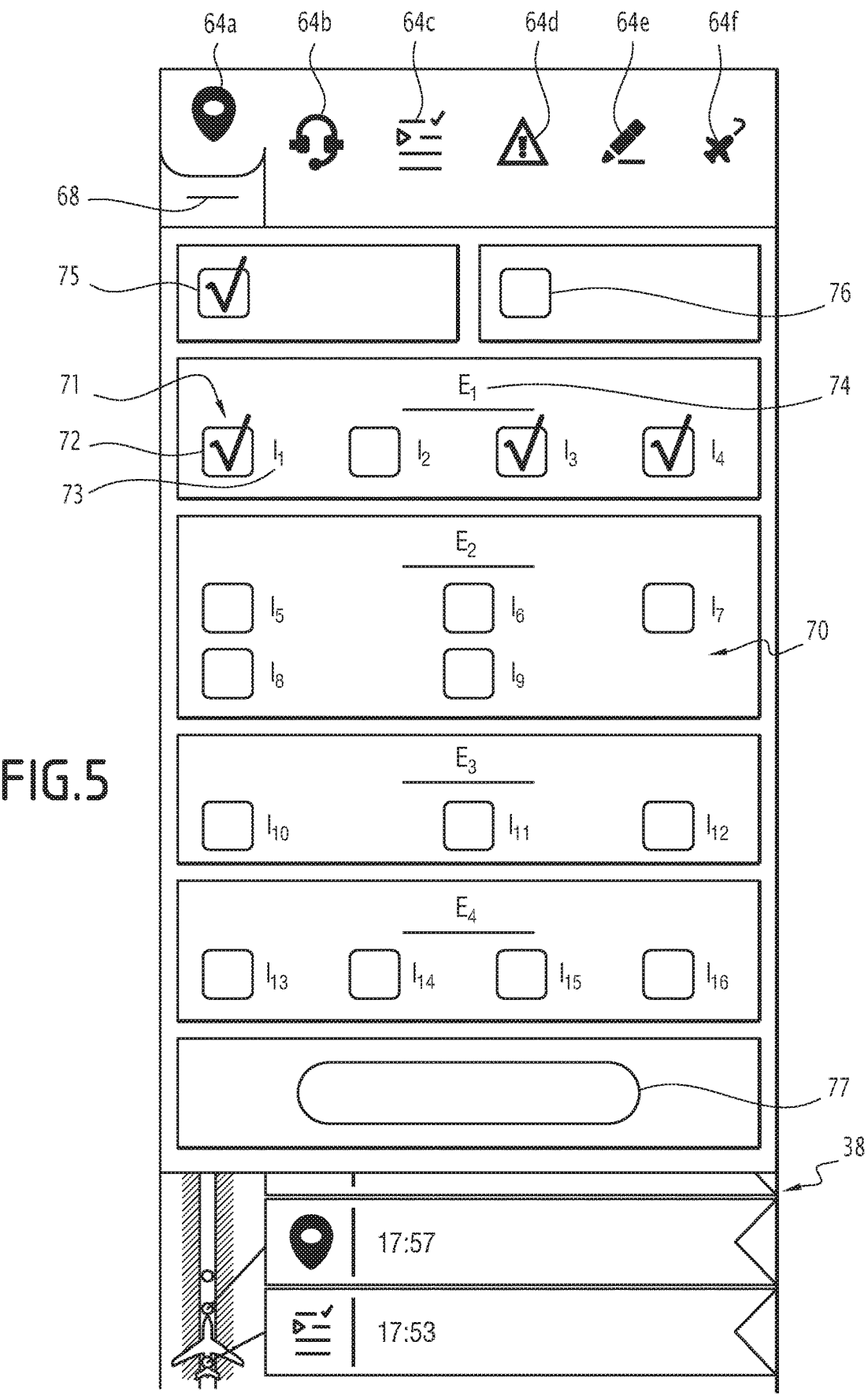
FIG. 5 illustrates a first display window which may be displayed by the display system the FIG. 1, for the selection of parameters.

An example of a parameterization window 70, superposed to the window 38 is illustrated in FIG. 5.

The parameterization window 70 comprises a plurality of parameterization areas 71, each associated with a piece of information $I_1, I_2 \ldots I_i \ldots I_{16}$ of a given nature. Each parameterization area comprises an activatable box 72, and an adjacent text area 73 reporting the nature of the piece of information associated with this activatable box.

The parameterization areas are grouped in several sets. A first set E1 groups general pieces of information relative to the mission or to the flight, notably the instant of occurrence provided for the event. A second set E2 groups navigation data, notably navigation data provided in a passage point. A third set E3 groups weather data, notably weather data provided in a passage point. A fourth set E4 groups diverse pieces of information.

Each set E1 to E4 is surmounted with a label 74 identifying this set.

Each box 72 may be selected or unselected by an operator via the man-machine interface 18, with view to displaying or to not displaying, in the display area, the piece of information associated with this box.

The parameterization window 70 also includes an activatable box 75, allowing selection of a predetermined set of pieces of information, and an activatable box 76, allowing selection of all the boxes 72. The activation of the box 75 thus causes automatic activation of the boxes 72 associated with the pieces of information of this predetermined set, excluding the other boxes 72, while the activation of the box 76 causes selection of all the boxes 72.

The parameterization window 70 further includes an area 77 forming an actuatable button, giving the possibility of returning to a default configuration of the nature of the displayed pieces of information. The actuation of this area 77 thus causes automatic activation and automatic selection of the boxes 72 of this set by default, excluding the other boxes 72.

The module 30 is configured for detecting an action for parameterization of the nature of the pieces of information to be displayed in the display areas 50, notably activation or inactivation of a box 72. The module 30 is moreover configured for determining, for each type of event, the nature of the pieces of information to be displayed in the display areas 50 and for accordingly displaying these pieces of information.

A second type of parameterization action of the nature of the pieces of information to be displayed in the display areas 50 is intended for the parameterization of the nature of the pieces of information displayed in a specific display area 50.

According to this second type, a parameterization action for example comprises a selection of the specific display area 50 by an operator, via the man-machine interface 18.

Figure 6:
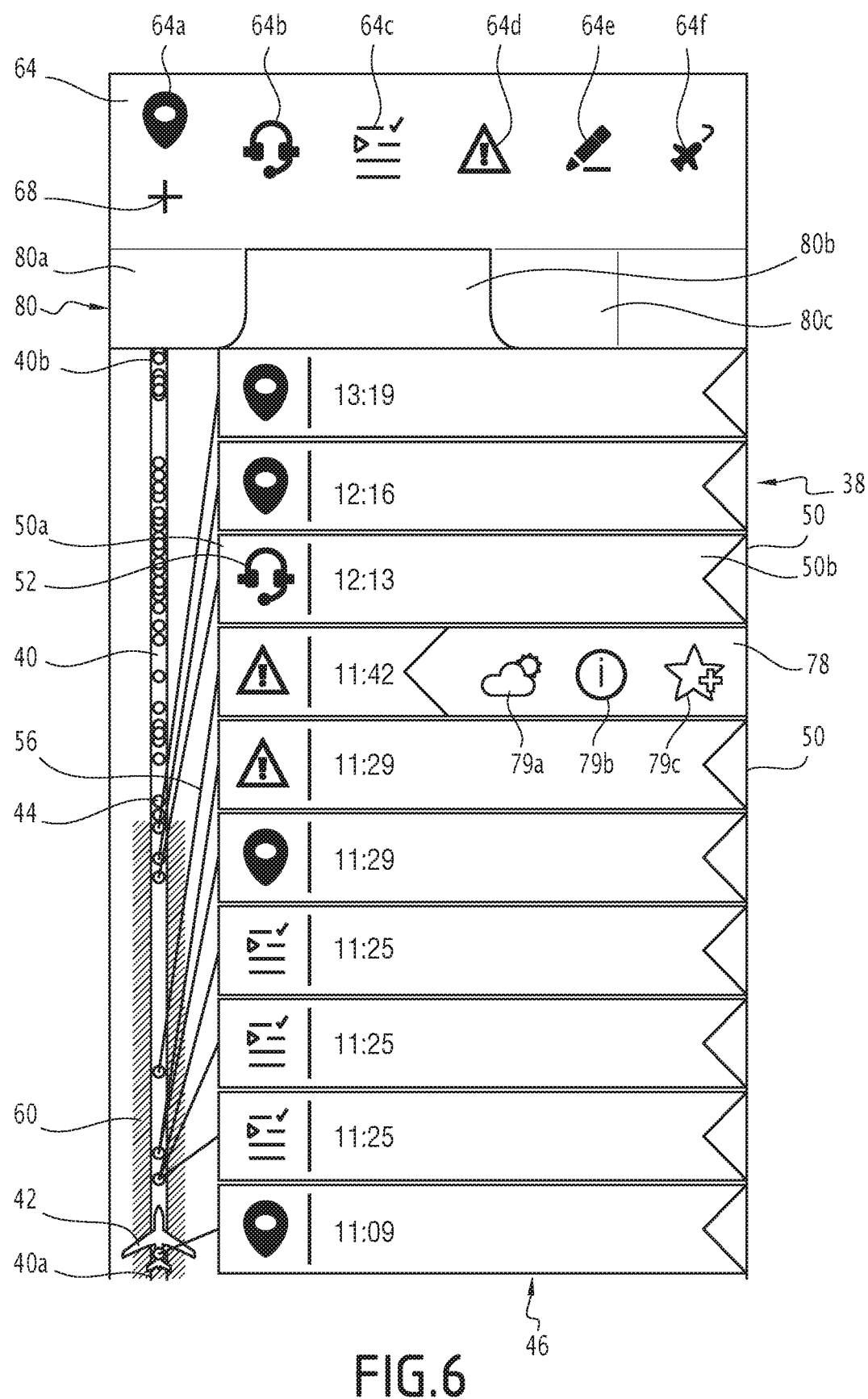
FIG. 6 illustrates a second display window which may be displayed by the display system of FIG. 1, for the selection of parameters.

The module 30 is configured for detecting such a selection action and for controlling the display, on the screen 20, of a parameterization window 78 of the nature of the pieces of information to be displayed in the selected display area 50. Such a parameterization window 78 is illustrated as an example in FIG. 6. This window 78 for example comprises several icons 79a, 79b which may be actuated by an operator by means of the man-machine interface 18, and intended for selection by the operator of one or several sets of pieces of information which have to be displayed in the selected display area 50. For example, an icon 79a allows selection or unselection of weather data and an icon 79b allows selection or unselection of complementary pieces of information. Further, an icon 79c gives the possibility of selecting the event associated with the display area 50 as a favorite event, for example with view to displaying this event independently of the selected types of events.

The module 30 is configured for determining the sets of pieces of information selected by the operator, and for accordingly displaying in the display area 50, the selected pieces of information.

In certain cases, only one portion of the pieces of information selected by the operator may be displayed in the display areas 50. Such cases may occur when the height of the display areas is insufficient for displaying the whole of the selected pieces of information.

In such cases, certain of the selected pieces of information are not displayed, but become visible as soon as the number of events in the series of events is reduced, and the height of the display areas 50 accordingly increased. Thus, a reduction in the number of displayed events in the information space 46 allows an operator to view a larger number of pieces of information in at least some of the display areas 50.

The module 30 is further configured for displaying on the window 38, in the example illustrated under the first series of icons 64, a second series of icons 80, intended to allow selection by an operator of the flight(s) of the mission for which the timeline is illustrated by the time scale 40.

Notably, in the illustrated example, an icon 80a allows selection of the whole of the flights of the mission, an icon 80b allows selection of a first flight of the mission, and an icon 80c allows selection of a second flight of the mission. Each icon 80 forms an actuatable area by an operator, via the man-machine interface 18.

This actuation is achieved by means of the man-machine interface 18, for example by positioning a control member on the area of the touch screen 20 displaying the icon 64.

The module 30 is configured for detecting an action for selecting the time period represented by the time scale 40, and for accordingly modifying the display of the pieces of information in the display frame 46.

Figure 7:
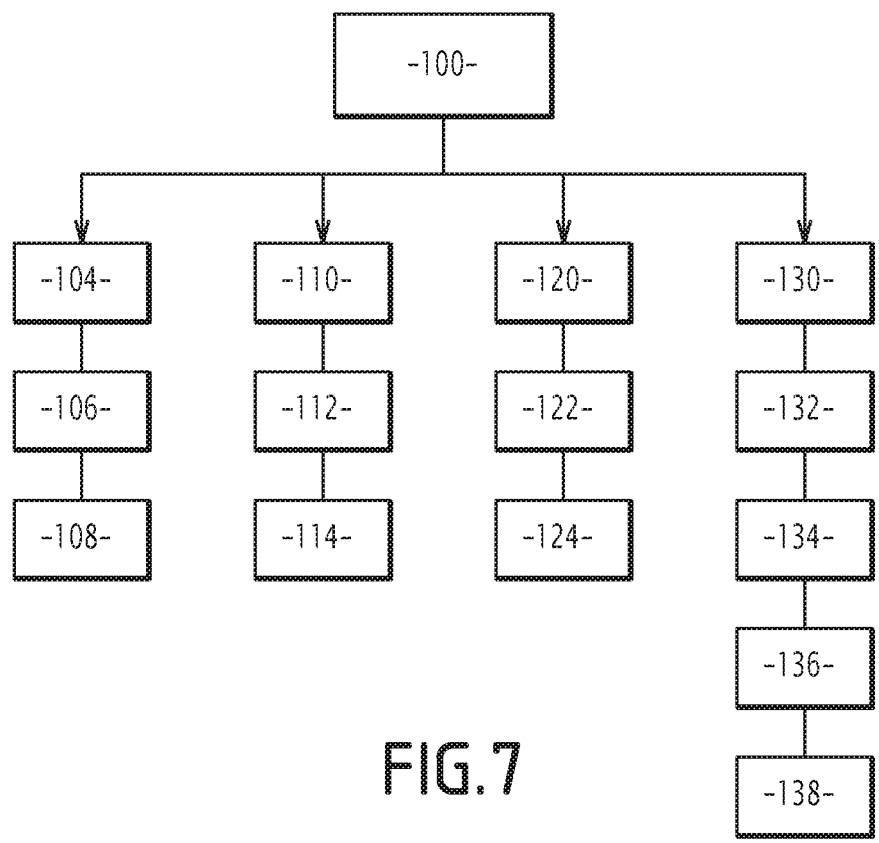
FIG. 7 is a diagram illustrating the application of a method according to an embodiment of the invention.

An example of an application of a method for viewing information, applied by means of the viewing system 10 described earlier, will now be described with reference to FIG. 7.

In an initial step 100, the module 30 generates an initial synthetic representation of events intended to occur when at least one flight of a mission of the aircraft, as described in FIG. 2 or in FIG. 3 and described with reference to these figures, and controls the display of this illustration on the window 38 of the screen 20.

In particular, the module 30 controls the display on the window 38 of a time scale 40 representative of a time period T of a mission of the aircraft.

The module 30 also controls the display, facing the time scale 40, of pieces of information relative to a series of events intended to occur in a time window FT comprised in the time period T represented by the time scale 40.

The time period T, the displayed series of events and the nature of the displayed pieces of information are for example defined by default.

Further, during step 100, the module 30 determines the time position and the duration of the time window FT.

In particular, the module 30 determines the initial instant of occurrence of the first event and the final instant of occurrence of the last event of the series of events, the time window FT being defined between this initial instant and this final instant.

The module 30 then displays the marker 60 along the time scale 40 so as to report this initial instant and this final instant. For example, as illustrated in FIGS. 2 and 3, the marker 60 extends along the timescale 40 between a first end positioned facing a first position on the time scale 40 corresponding to the initial instant and a second end positioned facing a second position on the timescale 40 corresponding to the final instant.

Upon carrying out the flight, the module 30 updates the representation displayed in real time.

Notably, the module 30 updates the pieces of information displayed for each event, for example weather information, or the instants provided for occurrence of these events, for example in the case of a deviation relatively to the flight plan.

Moreover, the module 30 updates the display of the time scale 40. Notably, if the first representative embodiment, illustrated in FIG. 2, is adopted, the module 30 shifts the time scale 40 gradually upon carrying out the flight, in particular repositions the markers 44 as well as the marker 60. If the second representative embodiment, illustrated in FIG. 3, is adopted, the module 30 modifies the position of the airplane model symbol 42 on the timescale 40.

Several actions for parameterization of this synthetic illustration by an operator, as well as the steps applied by the viewing system 10 subsequently to these actions, will now be described successively.

In order to modify the number of events comprised in the series of displayed events facing the time scale 40, an operator displaces two control members on the touch screen 20, facing the display frame 46, in two substantially opposite directions, during a step 104.

During a step 106, the module 30 detects this modification action and accordingly modifies the series of events, in particular the number of display areas 50 displayed facing the timescale 40.

Further, during a step 108, the module 30 determines a modified time position and duration of the time window FT, and accordingly updates the marker 60 along the time scale 40. In particular, the module 30 determines the initial instant of occurrence of the first event of the series of events, the final instant of occurrence of the last event, and positions the marker 60 between this initial instant and this final instant on the time scale 40.

In order to modify the time position of the series of events, during a step 110, an operator displaces a member on the screen tactile 20 in a direction substantially parallel to the time scale 40, facing the area of the screen displaying the areas 50, or facing the area of the screen displaying the marker 60.

During a step 112, the module 30 detects this modification action, and accordingly modifies the time position of the series of events displayed facing the time scale 40.

During a step 114, the module 30 determines a modified time position and duration of the time window FT, and accordingly updates the marker 60 along the timescale 40. In particular, the module 30 determines the initial instant of occurrence of the first event of the series of events, the final instant of occurrence of the last event, and positions the marker 60 between this initial instant and this final instant on the timescale 40.

In order to modify the type of events displayed facing the timescale 40, during a step 120, an operator actuates one or several of the icons 64 by means of the man-machine interface 18, in order to activate or deactivate these icons, with view to the display of selected types of events.

During a step 122, the module 30 detects this parameterization action, in particular the activation or the deactivation of an icon 64, and accordingly modifies the display of the pieces of information in the display frame 46. In particular, the module 30 displays in the display frame 46 the pieces of information relative to events of the selected type(s), excluding the other events.

The addition or the withdrawal of a type of events to be displayed may lead, if at least one event of this type is comprised in the current time window FT, to a modification of this time window FT. Indeed, the insertion or the suppression of one or several new display areas 50 leads, for a constant number of display areas, to a suppression of one or several display areas 50 associated with events intended to occur at the limits of the time window FT.

Thus, during a step 124, the module 30 determines a modified time position and duration of the time window FT, and accordingly updates the marker 60 along the time scale 40.

In order to modify the nature of the pieces of information displayed in the display area 50 for all the events of a given type, for example for the events of the type of overflight of a passage point, an operator actuates via the man-machine interface 18, during a step 130, the dedicated icon 68.

During a step 132, the module 30 detects this actuation and controls the display on the screen 20, of the window 70 for parameterization of the nature of the pieces of information to be displayed in the display area 50 for events of the type of overflight of a passage point.

During a step 134, the operator activates or inactivates at least one of the boxes 72, with view to causing the display or the non-display of pieces of information associated with this box.

During a step 136, the module 30 detects activation or inactivation of a box 72, determines the nature of the pieces of information to be displayed in the display areas 50, and accordingly modifies the pieces of information displayed in the areas 50 relative to the events of the type of overflight of a passage point.

During a step 138, the operator again actuates the icon 68. The module 30 detects its actuation and suppresses the display of the parameterization window 70.

The display system and method thus provide the crew with a representation of the events or tasks which will occur during a flight or a mission, by allowing the crew to locate these events in the time line of the flight, and to appreciate the work load required during the different flight phases.

It should be understood that the exemplary embodiments shown above are not limiting.

In particular, according to an alternative, the tactile control device is dissociated from the display device 16.

According to an alternative, the man-machine interface 18 comprises, as a replacement or in addition to the tactile control device, one or several control members, for example a mouse or a joystick, and/or a keyboard, a rotator . . . .

Moreover, according to a particular embodiment, the module 30 is configured for displaying on at least one second window, for example positioned facing the window 38, displaying a mapping, in a horizontal and/or vertical plane, on which is superposed a representative line of the provided horizontal and/or vertical trajectory of the aircraft.

The module 30 is configured for transferring on this trajectory line the different events intended to occur during the flight or the mission, as reported on the timescale 40 by the markers 44.

The module 30 is also configured for displaying along the trajectory line a marker representative of the position in time and of the duration of the time window FT.

Moreover, according to an alternative, the timescale may be reversed. In this case, the lower end 40a corresponds to the end of the flight and the upper end 40b corresponds to the current instant or to the beginning of the flight. Thus, the different display areas 50 are vertically ordered from top to bottom according to the provided instant of occurrence of the associated events.

According to another alternative, the time scale 40 extends horizontally. In another alternative, the system 10 is located in a ground station, the aircraft being a drone controlled by the crew located on the ground.

What is claimed is:

1. A display system configured for displaying information relative to at least one flight of an aircraft, the display system comprising:
   a display device,
   a display manager configured for managing a display on the display device of the information relative to the flight of the aircraft, the display manager being configured for controlling a display, on a window of the display device, of a timescale representative of a time period of the flight, and for controlling a display, facing the timescale, of pieces of information relative to a series of events intended to occur in a time window comprised in the time period,
   the display manager being configured for determining a position in time of the time window in the time period and a duration of the time window, and for controlling a display, along the timescale, of a first marker representative of the position in time and of the duration of the time window, the first marker being distinct from the timescale,
   wherein the series of events is intended to occur between an initial instant of occurrence of a first event of the series of events, and a final instant of occurrence of a last event of the series of events, and in that the time window is defined between the initial instant and the final instant, the final instant occurring chronologically after a current instant, and
   wherein the first marker extends along the timescale from a first end, positioned facing a first position on the timescale corresponding to the initial instant, to a second end, positioned facing a second position on the timescale corresponding to the final instant,
   wherein the display manager is configured for controlling the display, for each of a plurality of events of the series of events intended to occur in the time period, of a second marker positioned along the timescale in a position representative of the instant at which the event is intended to occur, the first marker being configured such that a plurality of the second markers are encompassed by the first marker during the flight of the aircraft.

2. The display system according to claim 1, wherein the display manager is configured for determining the initial instant and the final instant, the first marker being indicative of the initial instant and of the final instant.

3. The display system according to claim 1, further comprising a man-machine interface, wherein the display manager is configured for detecting an modification action intended to modify the series of events, performed by an operator via the man-machine interface, for determining a modified series of events to be displayed in response to the modification action, and for controlling a display, facing the timescale, of the modified series of events.

4. The display system according to claim 3, wherein the display manager is configured for determining a modified time window in which the modified series of events is intended to occur, and for controlling a display, along the timescale, of a modified first marker representative of a position in time of the modified time window in the time period and of a duration of the modified time window.

5. The display system according to claim 3, wherein the modification action comprises a modification of a number of events comprised in the series of events.

6. The display system according to claim 3, wherein the modification action comprises a modification of the position in time of the time window in the time period.

7. The display system according to claim 1, wherein at least one portion of the events of the series of events is selected from the group consisting in overflying a passage point by the aircraft, an establishment of a radio communication, an initiation of a procedure and a weather event.

8. A method of display of information relative to at least one flight of an aircraft, comprising:
   displaying, on a display device, of a timescale forming a time scale representative of a time period of the flight;
   displaying, facing the timescale, of pieces of information relative to a series of events intended to occur in a time window comprised in the time period;
   determining a position in time of the time window in the time period and a duration of the time window;
   displaying, along the timescale, a first marker representative of the position in time and of the duration of the time window, the first marker being distinct from the timescale,
   wherein the series of events is intended to occur between an initial instant of occurrence of a first event of the series of events, and a final instant of occurrence of a last event of the series of events, and in that the time window is defined between the initial instant and the final instant, the final instant occurring chronologically after a current instant, and
   wherein the first marker extends along the timescale from a first end, positioned facing a first position on the timescale corresponding to the initial instant, to a second end, positioned facing a second position on the timescale corresponding to the final instant; and
   displaying, for each of a plurality of events of the series of events intended to occur in the time period, a second marker positioned along the timescale in a position representative of the instant at which the event is intended to occur, the first marker being displayed to encompass a plurality of the second markers during the flight of the aircraft.

9. The method of display according to claim 8, further comprising:
   detecting a modification action of the series of events, applied by an operator via a man-machine interface;
   determining a modified series of events to be displayed in response to the modification action; and
   displaying, facing the timescale, the modified series of events.

10. The method of display according to claim 9, further comprising determining a modified time window in which the modified series of events is intended to occur, and displaying, along the timescale, a modified first marker representative of a position in time of the modified time window in the time period and of a duration of the modified time window.

11. The method of display according to claim 9, wherein the modification action comprises a modification of a number of events comprised in the series of events.

12. The method of display according to claim 9, wherein the modification action comprises a modification of the position in time of the time window in the time period.

13. The display system according to claim 1, wherein the display device is in a cockpit of the aircraft.

14. The display system according to claim 1, wherein the time window corresponds to a fraction of the time period.

15. The display system according to claim 1, wherein the time period corresponds to a portion of the flight.

16. The display system according to claim 15, wherein the time period is defined between the current instant and the end of the flight.

17. The display system according to claim 1, further comprising a man-machine interface, wherein the display manager is configured for detecting a selection, performed by an operator via the man-machine interface, between a first representation, in which the time period corresponds to a portion of the flight, and a second representation, in which the time period is defined between the beginning of the flight and the end of the flight, for determining a modified timescale in response to the selection, and for controlling a display of the modified timescale.

18. The display system according to claim 1, wherein the first marker is a colored area superposed to the time scale.

19. The display system according to claim 1, wherein the first event of the series of events is distinct from the take-off of the aircraft.

20. The display system according to claim 7, wherein the series of events comprise at least overflying predefined passage points by the aircraft, according to a flight plan, and wherein the pieces of information relative to a series of events comprise, for each overflight of a passage point, an identifier of said passage point, and/or the longitude and latitude coordinates of the passage point, and/or navigation data provided in said passage point, and/or weather data in said passage point and/or a fuel reserve of the aircraft.

21. The display system according to claim 1, configured for displaying information relative to at least one mission of the aircraft, the mission comprising a plurality of successive flights, the display manager being configured for controlling a display, on the window of the display device, of a timescale representative of a time period of the mission, and for controlling a display, facing the timescale, of pieces of information relative, for each flight of the mission, a series of events intended to occur in a time window comprised in the time period, the time period corresponding to the whole of the mission.

22. The display system according to claim 1, wherein the pieces of information relative to each event of the series of events are displayed in a dedicated display area, the display manager being configured for controlling a display, for each display area, of a respective link, the respective link extending from a first extremity connected to the display area to a second extremity connected to the second marker of the time scale which is associated with the event.

* * * * *